April 21, 1959     T. W. MUNFORD     2,883,171
FURNACE CONVEYOR SYSTEM
Filed Aug. 10, 1955     9 Sheets-Sheet 1
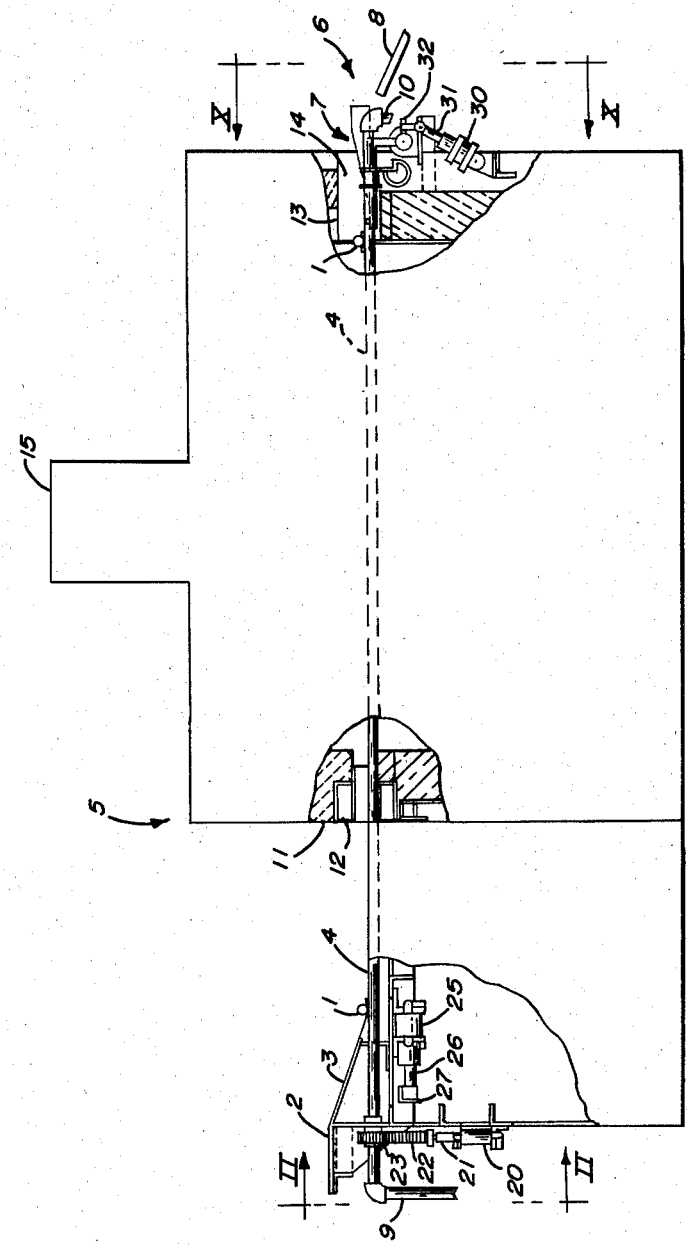
Fig. I
INVENTOR.
THEODORE W. MUNFORD
BY Charles I. Haughey
ATTORNEY

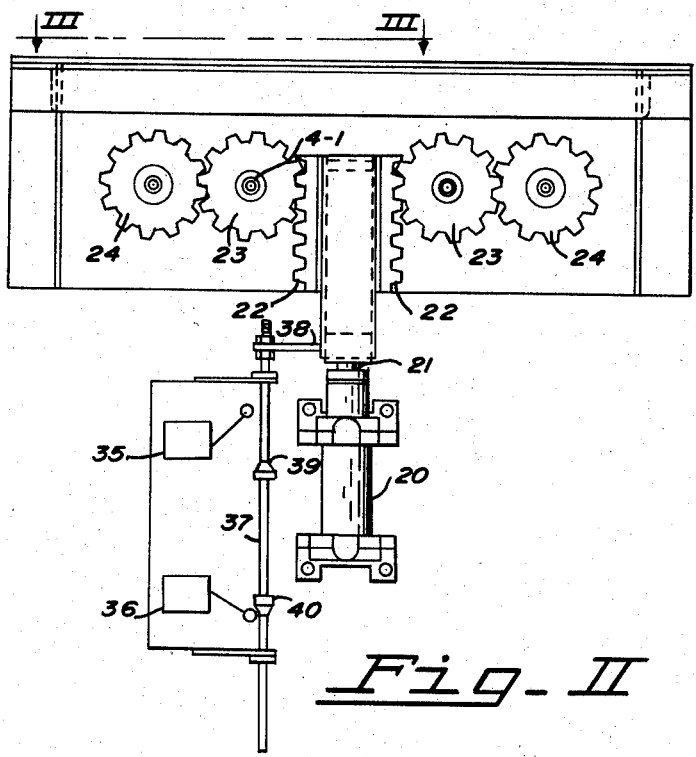
Fig. II
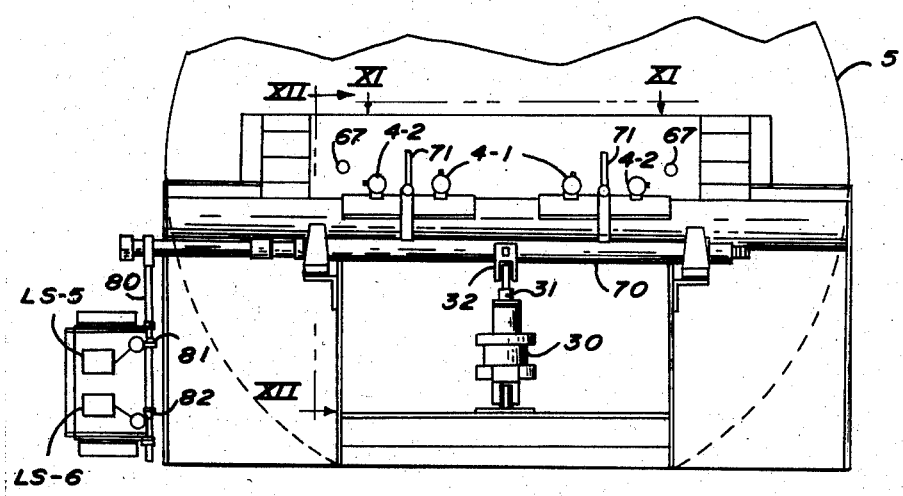
Fig. X
INVENTOR.
THEODORE W. MUNFORD
BY
ATTORNEY

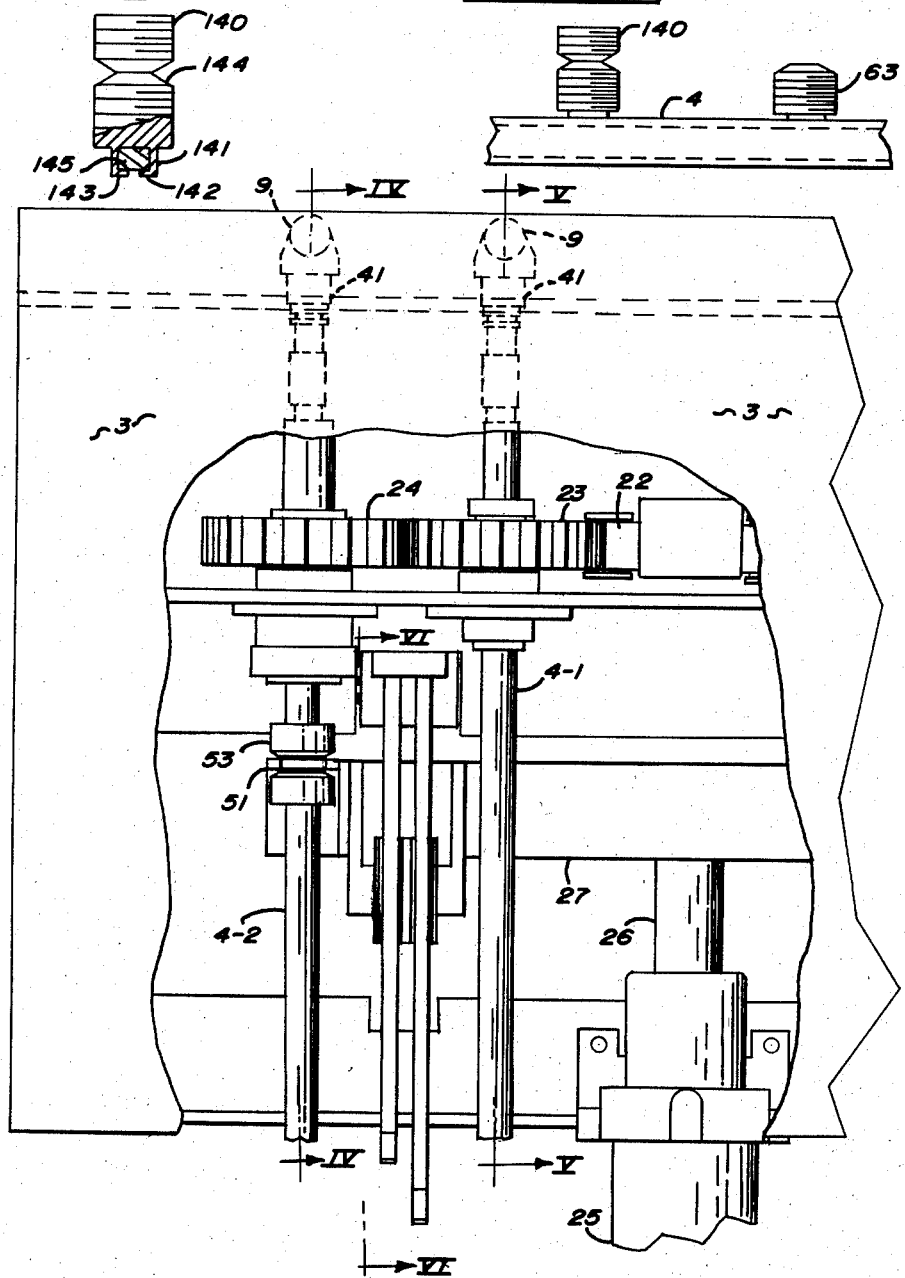

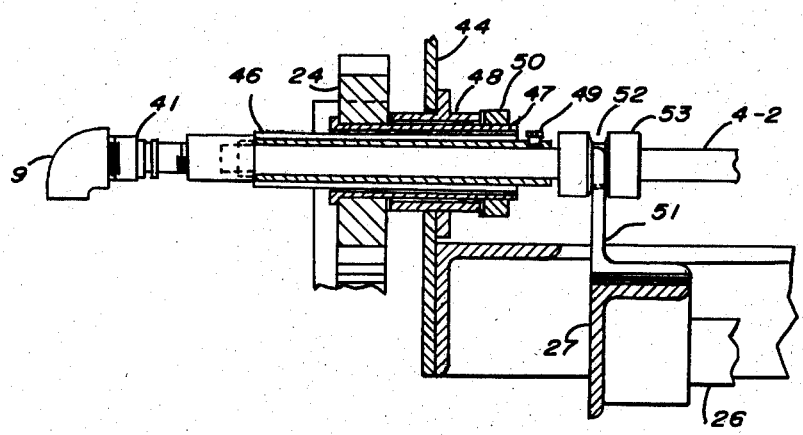
Fig. IV
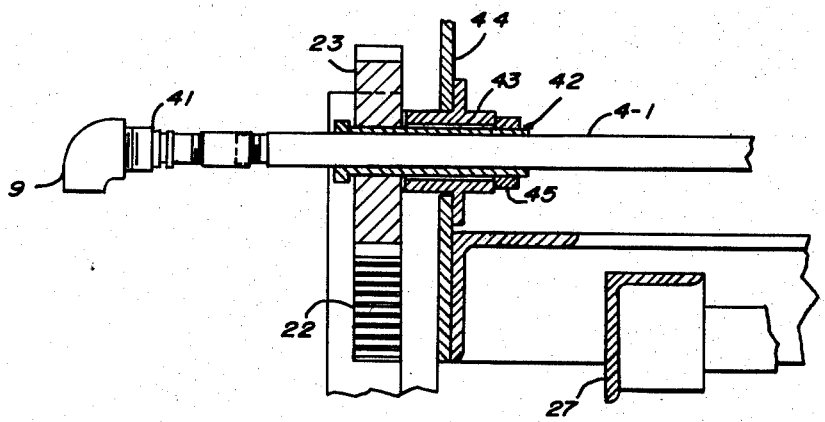
Fig. V
INVENTOR.
THEODORE W. MUNFORD
BY
Charles S. Haughey
ATTORNEY April 21, 1959
T. W. MUNFORD
2,883,171
FURNACE CONVEYOR SYSTEM
Filed Aug. 10, 1955
9 Sheets-Sheet 5
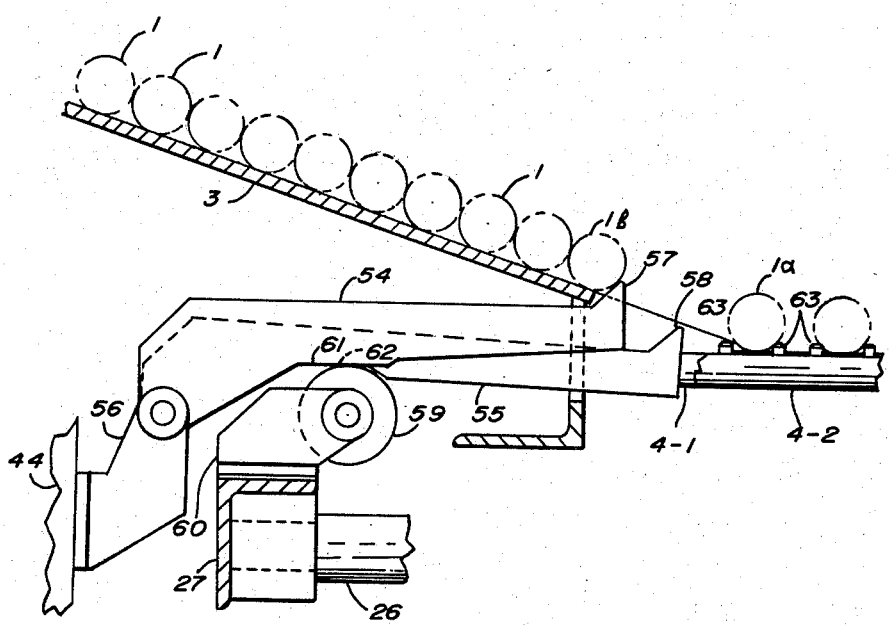
_Fig. VI_
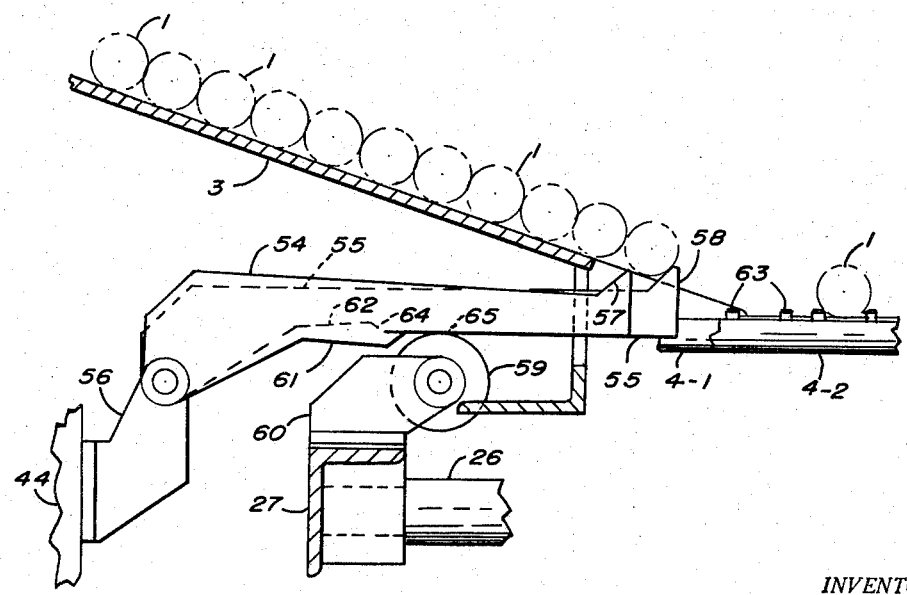
_Fig. VII_
INVENTOR.
THEODORE W. MUNFORD
BY
Charles S. Haughey
ATTORNEY

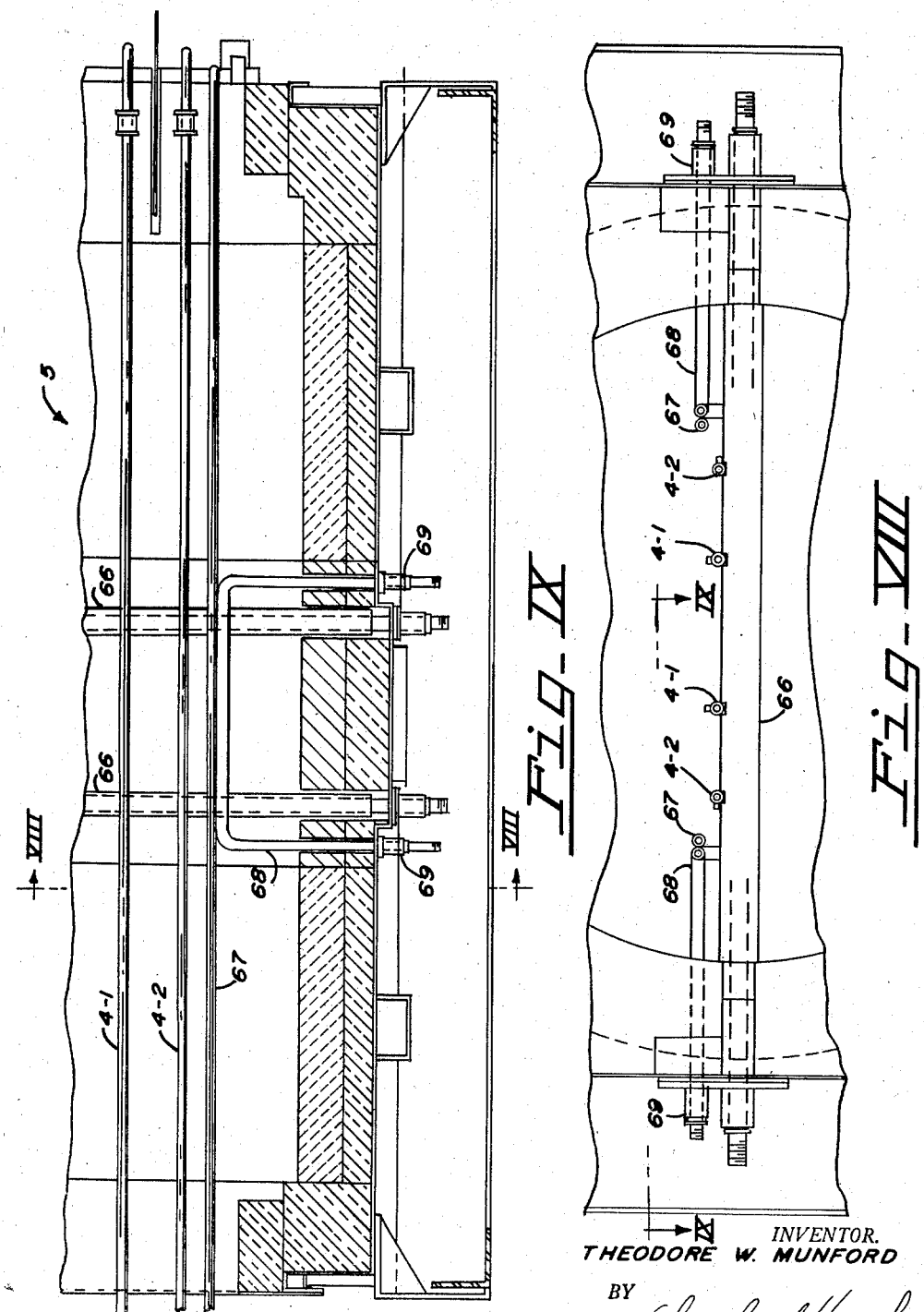

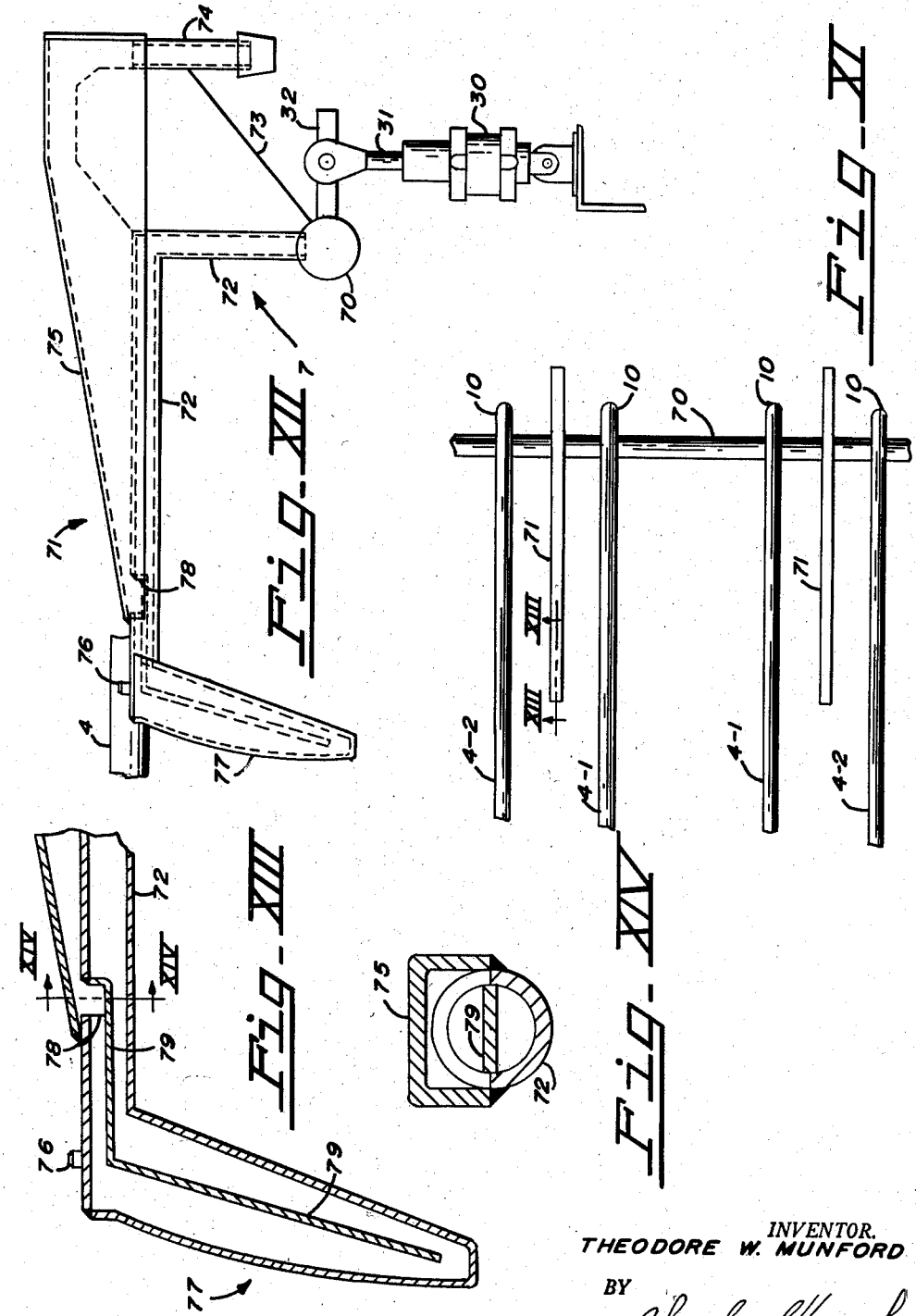

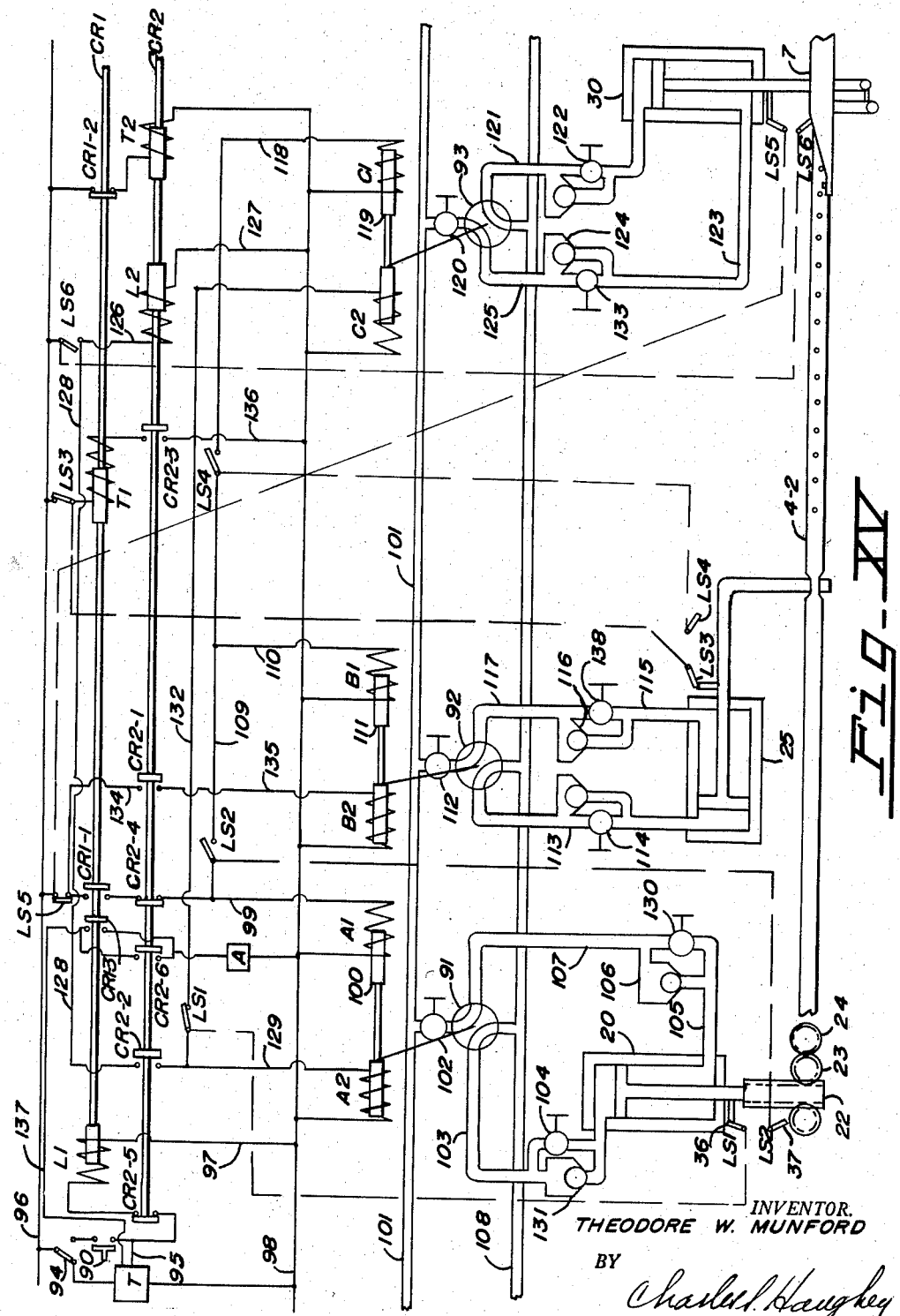

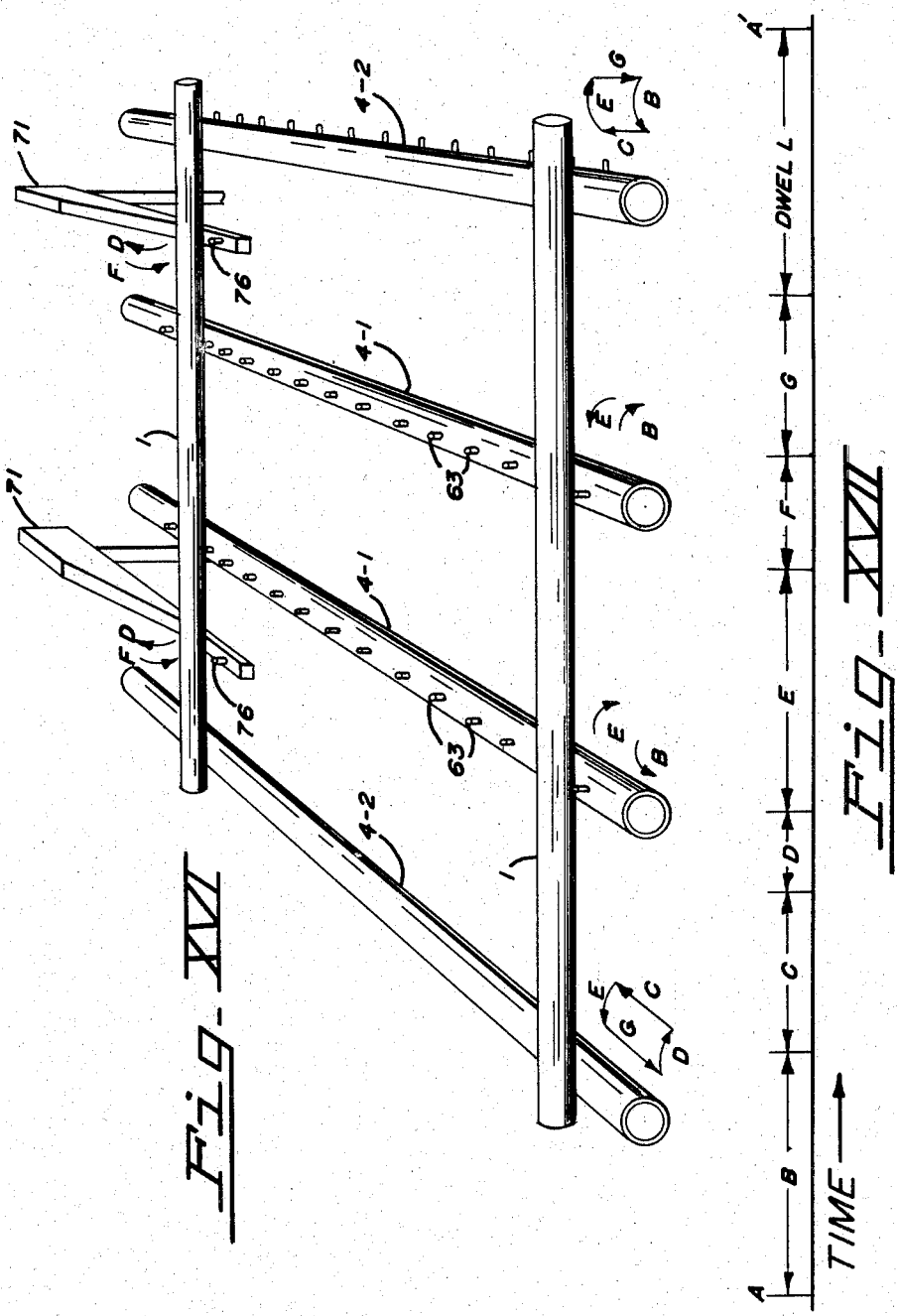

United States Patent Office 2,883,171
Patented Apr. 21, 1959

2,883,171

FURNACE CONVEYOR SYSTEM

Theodore W. Munford, Toledo, Ohio, assignor to Surface Combustion Corporation, Toledo, Ohio, a corporation of Ohio Application August 10, 1955, Serial No. 527,535

16 Claims. (Cl. 263—6)

This invention relates to furnace conveyor systems and in particular to an arrangement of a furnace and conveying system for automatically carrying work pieces from a loading station through the furnace and discharging them in heated condition at the discharge end of the furnace.

The principal object of this invention is to provide a conveyor system for a furnace in which the conveyor system carries the work so that the work is uniformly exposed to the heating atmosphere and radiant heat of the furnace and so that selected portions of the work may be protected from overheating.

Another object of the invention is to provide a conveyor system for a furnace in which the conveyor system has a minimum of contact with the work pieces and may itself be water cooled to prevent deterioration of the conveyor system elements.

A still further object of the invention is to provide a conveyor system that is extremely flexible in timing so as to permit easy adjustment of the length of time that a work piece is held in the furnace on its way therethrough.

A still further object of the invention is to provide a conveyor system for generally cylindrical work pieces in which the work piece is rotated under controlled conditions during its passage through the furnace so as to expose all of its surface uniformly to the heating atmosphere and radiant heat.

An ancillary object of the invention is to provide readily adjustable shielding means extending generally parallel to the path of the work for preventing overheating of certain portions of the work pieces.

A still further object of the invention is to provide a conveyor system in which all portions of the conveyor subjected to the heat of the furnace or of the heated work pieces are internally cooled.

These and more specific objects and advantages are obtained in a furnace and conveyor system constructed according to the invention.

According to the invention, the preferred embodiment of the improved furnace and conveyor system is constructed with tubular work support rails all of which are rotatable or rockable through at least a limited distance and some of which are also axially slideable. Each of the rails has a smooth work supporting surface along one longitudinal element of the rail and an interrupted work supporting surface along a circumferentially spaced longitudinal element of the rail.

The rails are divided into two sets, one set being axially slideable and the other not. The rails are interconnected for relative rotation so that when the interrupted surfaces of one set of rails are presented to the work the smooth surfaces of the other set of rails are presented to the work. By a combination of rotation and reciprocation of the rails the work is moved stepwise from position to position along the length of the rails. The invention also includes along with the conveyor system an escapement mechanism for admitting work pieces to the rails at the entrance end of the furnace and an unloading mechanism that lifts the heated work pieces from the rails onto a take away conveyor or track. In connection with the conveyor, the system includes additional guide means, also water cooled, positioned along the path of the work pieces through the furnace so as to guide the pieces and shield selected portions of the work pieces from the radiant heat of the furnace walls and thus control the heating of the work pieces. These additional guide means are supported for ready adjustment with respect to the path of the work pieces. The conveyor system is preferably hydraulically operated with hydraulic and electrical controls being used to interlock the action of the hydraulic operating mechanisms so as to provide the proper sequence of operations and by regulating the flow of hydraulic fluid regulate the speed of operation with which the work pieces are transmitted from position to position on their way through the furnace.

The invention also includes a novel method of attaching studs to the rails to provide the interrupted work supporting surfaces.

A preferred embodiment of the invention is illustrated in the accompanying drawings.

In the drawings:

Figure I is a side elevation, with some parts shown in section, illustrating the general arrangement of the conveyor system, loading mechanism, furnace, and unloading mechanism.

Figure II is a fragmentary end elevation of the furnace and conveyor substantially as seen from the line II—II of Figure I.

Figure III is a fragmentary plan view of the loading end of the conveyor substantially as seen from the line III—III in Figure II.

Figure IV is a fragmentary vertical section taken along the line IV—IV of Figure III.

Figure V is a fragmentary vertical section taken substantially along the line V—V of Figure III.

Figure VI is a fragmentary side elevation taken substantially along the line VI—VI of Figure III showing the escapement mechanism for admitting work pieces to the rails of the conveyor.

Figure VII is similar to Figure VI showing the mechanism in another portion of its cycle of operation so as to show the cooperation between the various parts of the escapement mechanism.

Figure VIII is a fragmentary vertical transverse section of the furnace taken substantially along the line VIII—VIII of Figure IX.

Figure IX is a fragmentary horizontal section of the furnace taken substantially along the line IX—IX of Figure VIII.

Figure X is an end elevation of the discharge end of the furnace and conveyor assembly as seen from the line X—X of Figure I.

Figure XI is a fragmentary or schematic plan view of the unloading end of the conveyor system substantially as seen from the line XI—XI of Figure X.

Figure XII is a fragmentary side elevation of the unloading mechanism as seen from the line XII—XII of Figure X.

Figure XIII is a fragmentary enlarged vertical section of the portion of the unloading mechanism as seen from the line XIII—XIII of Figure XI.

Figure XIV is an enlarged vertical section through one of the tines of the unloading mechanism as seen from the line XIV—XIV of Figure XIII.

Figure XV is a generally schematic wiring and hydraulic circuit diagram of the control and operating mechanism for the conveyor system.

Figure XVI is a generally schematic isometric diagram of the conveyor system illustrating the sequence of operations.

Figure XVII is an elementary timing diagram illustrating the duration of time for each step in the cycle of operation of the conveying mechanism.

Figure XVIII is a view of one of the studs used on the conveyor rails before being welded in place.

Figure XIX is a fragmentary view of a conveyor rail with two studs, one of which has just been welded in place and the other welded and trimmed.

These specific figures and the accompanying description are intended merely to illustrate the invention and not to impose limitations on the claims.

In a furnace conveyor system constructed according to the invention work pieces 1 travel by gravity from a loading station 2 down a ramp 3 and onto a plurality of longitudinally extending rails 4 that extend from a point beneath the loading station 2, through a furnace 5 to an unloading station 6. At the unloading station 6 a rocking fork 7 lifts the work pieces 1 from the rails 4 allowing them to roll across the rocking fork 7 and down an inclined discharge ramp 8.

As will be shown in greater detail later the rails 4 are tubular and are provided with water inlet connections 9 and outlet connections 10. The furnace 5 is of conventional construction including refractory walls 11 which are provided around the inlet end with water boxes 12 framing the inlet to the oven to prevent discharge of heat and consequent heating of the area around the inlet of the furnace 5. Similar water cooling passages 13 are provided around the discharge opening 14 of the furnace.

The furnace is preferably gas-fired by burners, not shown, and the exhaust gases escape through a stack or chimney 15. Sufficient draft may be provided, if desired, at the chimney 15 to draw air into the mouth and discharged openings of the furnace and thus further minimize the spilling of heat through these openings.

The conveying action of the rails 4 is produced by a combination of forward and backward rotation or rocking of all of the rails combined with properly synchronized linear motion of certain of the rails. All of the rails are provided with interrupted work engaging surfaces extending along one side of each rail and a smooth working engaging surface extending along a circumferentially spaced portion of each rail. The work is moved from position to position on its way through the furnace by being engaged by the interrupted work engaging surfaces of the axially movable rails during a forward stroke and then being engaged by the interrupted surfaces of the solely rotatable rails during the backward stroke of the slideable rails. The rotation or rocking of the rails is produced by a hydraulic cylinder 20 the piston rod 21 of which carries a rack 22 meshing with gears 23 mounted on an inner pair of the rails 4 marked 4—1. The gears 23, see also Figure II, mesh with and drive gears 24 that are spline connected to the outer pair of the rails 4 marked 4—2.

The longitudinal reciprocation of the outer pair of rails 4—2 is produced by a second hydraulic drive cylinder 25 the piston rod 26 of which is connected to the cross head 27. The cross head 27, is yoke connected to the outer pair of the guide rails 4 and also through mechanism shown in Figures VI and VII, operates the escapement mechanism for admitting work pieces from the ramp 3 to the rails 4.

When the work pieces have passed through the furnace and reached the discharge end they are lifted from the conveyor rails 4 by the tilting unloading fork 7 which is driven by a third hydraulic cylinder 30 having a piston rod 31 connected through a lever 32 to the axle of the fork 7 so as to rock the fork when the hydraulic cylinder is actuated. The unloading mechanism is shown in greater detail in Figures XI, XII, XIII, and XIV.

Referring now in particular to Figures II, III, IV, and V upward motion of the rack 22 drives the left hand one of the gears 23 counterclockwise, the stroke of the hydraulic cylinder being arranged so that the gear 23 and the support rail 4—1 driven thereby is turned approximately a quarter of a revolution. The gear 24 on the outer rail 4—2 is of the same size as the gear 23 so that that rail is also rotated a quarter of a revolution by the stroke of the hydraulic cylinder. The system is symmetrical with corresponding rails on the other side of the lonigtudinal center line that are similarly rotated except in opposite sense, i.e., the inner rail turns clockwise and the outer rail turns counterclockwise with upward movement of the rack 22. Limit switches 35 and 36 are mounted adjacent the hydraulic cylinder 20 and are arranged to be operated by a slide rod 37 the upper end of which is connected to a side arm 38 of the piston rod 21. Collars 39 and 40 are mounted on the slide rod 37 to cooperate with the actuators or arms of the limit switches 35 and 36. The limit switches 35 and 36 are connected in the control circuit to indicate when the hydraulic cylinder 20 has driven its piston rod 21 substantially to the ends of its stroke.

It was mentioned previously that the rails 4 were water-cooled with water flowing into water connections 9. These connections are shown in greater detail in Figures III, IV and V and as shown in Figures IV and V each of the connections 9 includes a swivel union 41 so that the rails may rotate without disturbing the water flow through the rails.

The details of construction of the drive and support for the rails 4—1 is shown in greater detail in Figure V. As shown, each of the rails 4—1 extends through a sleeve 42 that is journaled in a sleeve bearing 43 mounted in a support member 44. The gear 23 is mounted on and keyed to the sleeve 42 so as to positively turn the sleeve with rotation of the gear. Likewise the sleeve 42 is clamped securely to the rail 4—1 by a clamping nut 45 that squeezes a split end of the sleeve 42 onto the rail 4—1 in the same manner as a collet chuck. The rails 4—1 are thus secured by the sleeve 42 and bearing 43 against axial motion while it may be rotated to and fro approximately a quarter of a revolution by operation of the hydraulic cylinder 20.

A generally similar arrangement is used for operating the transport or axially slideable rails 4—2 as shown in Figure IV. As indicated in this figure the rail 4—2, which is hollow to permit water cooling, is held or gripped in a splined sleeve 46 that is axially slideable through a second internally splined sleeve 47 which in turn is rotatably mounted in a bearing 48 fixed in the support member 44. The splined sleeve 46 is preferably locked to the hollow rail 4—2 by a set screw 49. The drive gear 24 is keyed onto the internally splined sleeve 47 and held at one end against a flange of the sleeve. The other end of the sleeve 47 carries a retaining nut 50 that bears against the end of the bearing 48.

The axial drive motion from the hydraulic cylinder 25 and the cross head 27 is transmitted through yokes 51 erected on the cross head 27 and engaging a groove 52 in a grooved collar 53 fixed to the rail 4—2. In this arrangement the gear 24 by means of the splined sleeve 46 may transmit rocking or rotatable motion to the rail 4—2 at the same time as the cross head 27 acting through the yoke 51 and collar 53 may impart axial reciprocating motion. These motions may occur simultaneously or alternately as desired. The rocking or rotatable motion of the rails 4—2 is permitted by the swivel unions 41 included between the water connections 9 and the end of the rails 4—2.

The feeding of the work pieces 1 from the ramp 3 onto the rails 4 is controlled by an escapement mechanism illustrated in Figures VI and VII. This mechanism includes a pair of latch levers or pawls 54 and 55 that are pivotally mounted on a bracket 56 attached to the support member 44. The pawls 54 and 55 have upwardly directed toothed ends 57 and 58 spaced apart in the direction of movement of the work pieces 1 a distance approximately equal to the diameter of one of the work pieces. The pawls are held in operative position by a roller 59 carried in a bracket 60 mounted on the cross head 27 and adapted to engage cam surfaces 61, 62 on the bottom edges of the pawls 54 and 55 respectively. As shown in Figure VI, the position occupied when the hydraulic cylinder 25 has extended its piston rod 26 to the limit of its travel, the cam surfaces 61 and 62 are in engagement with the roller 59 and the tooth 57 is in position to engage a work piece 1 while the tooth 58 has dropped below the path of the work pieces to allow the leading piece 1a to roll down onto the rails 4. When the hydraulic cylinder 25 is actuated to retract its piston rod 26 and cross head 27 the cross head 27 moves to the right toward the position shown in Figure VII. As the roller 59 moves it runs off the cam surface 61 of the pawl 54 thus allowing this pawl to drop and lower its tooth 57 out of the path of the work pieces on the ramp 3. However, before the roller leaves the cam surface 61 it engages an inclined portion 64 adjoining the cam surface 62 of the pawl 55 and as it follows along the surface 64 onto a second cam surface 65 it elevates the longer pawl 55 so that its tooth 58 is brought into the path of the work pieces 1. When the roller reaches the end of its stroke, the position shown in Figure VII, the tooth 58 of the pawl 55 is elevated far enough to stop the rolling of the work pieces 1 down the ramp 3 while the tooth 57 is located below the path of the work pieces and generally below the space between two such pieces. The previous work piece 1a having been brought onto the rails 4—2 at the position shown in Figure VI is moved one position to the right as the transport rails 4—2, yoked to the cross head 27, are moved to the position shown in Figure VII.

Upon the next return stroke of the hydraulic cylinder 25, driving the cross head back to the position shown in Figure VI, the second pawl 55 is dropped while the first pawl 54 is raised to the position shown in Figure VI. In this manner the work piece next to the tooth and held by the tooth 58 is freed and allowed to roll down the ramp 3 and onto the rails 4. The cam surfaces 61, 62, 64 and 65 are arranged so that, during the transfer from one position to the other, both of the pawl levers 54 and 55 are elevated at the midpoint of the stroke. This insures that at no time is the path of the work pieces completely cleared so that work pieces could roll unchecked down the ramp 3 on the rails 4. On the following stroke to the right when the roller 59 takes the position shown in Figure VII the series of work pieces on the ramp are allowed to move down one step thus bringing the next piece into position against the pawl 58 ready for the next cycle.

From the escapement loading mechanism shown in Figures VI and VII the work pieces 1 are moved stepwisely through the furnace 5 which is shown in greater detail in Figures VIII and IX. As shown in Figure IX the rockable or rotatable rail 4—1 is near the upper part of Figure IX while the companion rotatable and axially slideable rail 4—2 is just below it. Since Figure IX shows only half of the horizontal cross section of the oven it should be understood that the other rails are similarly located in the portion not shown. The rails 4 are supported on water-cooled cross members 66, see also Figure VIII, that extend transversely across the furnace 5 with their ends protruding from the sides of the furnace to receive cooling water connections. The cross members 66 each comprises a steel or iron pipe or tube having a ceramic or fire clay coating to limit the rate of heat transfer from the furnace atmosphere into the tube and thus keep down the temperature of the wall of the tube. A guide rail is positioned along the top of each of the tubes 66 and has notches, as may be seen in Figure VIII, to receive and support the rockable and slidable rails 4—1 and 4—2 respectively.

A tubular guide or shadow rail 67, that is welded along the bottom of a hollow U-shaped holder 68, is located parallel to and laterally adjacent the path of the ends of the work pieces 1 as they are carried along the rails 4—1 and 4—2. The sides of the holder 68 extend through and are slidable in stuffing boxes 69 in the side wall of the furnace 5. The lateral position of the guide rail or shadow rail 67 is adjusted by sliding the U-shaped holder 68 into or out of the side wall of the furnace 5. The span between the sides of the U-shaped member 68 is short enough that a person may grasp both sides and easily adjust the position of the rails as required by sliding the holder in or out through the stuffing boxes 69 arranged in the side of the furnace wall.

Both the shadow rail 67 and its U-shaped holder 68 are water-cooled to prevent burning or scaling of the material forming these members. The shadow rail 67, besides guiding of the work pieces and preventing them from straying sideways off of the conveyor rails 4, shields the ends of the work pieces from the intense heat in the furnace. This is necessary to prevent overheating the ends of the work pieces when the furnace is operated at its normal operating rate. If work pieces are slowly passed through a furnace such as an annealing or soaking furnace the temperature of the atmosphere and the radiant heat is such that work pieces are slowly brought to the desired temperature and held there. In such a furnace the temperature of the gas and the work is substantially the same. However, when it is desired to rapidly raise the work pieces to a given elevated temperature it is necessary that the atmospheric temperature and the radiant heat be much higher than the actual temperature of the work piece in order to secure a rapid flow of heat from the atmosphere into the work piece. The surface temperature of the work piece in this method of operation is determined by the rate of heat conduction from the surface into the interior of the work piece. At the ends of the piece, where surfaces of both the sides and the end are exposed to the high temperature there is greater ratio of surface area to volume than near the center of the length of the work piece. To get uniform heating of the work in this method of operation it is necessary to restrict or shade the ends of the work piece so that the piece is heated primarily by heat conduction through the side walls of the work piece rather than from the ends. For this reason the shadow rails 67 are kept relatively cold and closely adjacent the ends of the work piece thus preventing the pick up of heat through the end surfaces which would raise the rate of heat flow into the ends of the work piece as compared to the rate of heat flow into the central portions of the work piece.

Although not shown in the drawings it is to be understood that suitable water connections are provided on both the support members 66 and the shadow rail 67 and the U-shaped holder 68 so that an adequate flow of cooling water may be maintained in these members.

As the work pieces 1 are carried through the furnace 5 they approach the discharge or unloading station 6 that is illustrated in greater detail in Figures X, XI, XII, XIII and XIV. This mechanism comprises a cross pipe 70 that serves as an axle for the unloading fork 7. The rocking or unloading fork 7 comprises a pair of tines 71 which are located one on each side of the center line of the furnace and each between the rails 4—1 and 4—2 of its particular side. These tines, by rocking motion, are adapted to lift the work pieces from the rails 4—1, 4—2 and then, by the tilting, cause the work pieces to roll across their upper surfaces onto the unloading ramp 8 shown in Figure I. The purpose of this rocking fork is to lift the work pieces over the water connections at the ends of the rails 4. While not specifically shown in the drawings it is to be understood that the discharge ends of the rails 4 are each provided with swivel unions similar to those at the loading end, for the passage of water from supply or discharge lines into or from the rails 4 while still permitting the rocking or rotating motion of the rails.

Each of the tines 71 comprises the pipe or tube 72 that is mounted on and in flow connection with the cross pipe or axle 70 and that is formed with an upright section and a horizontal section extending parallel to the rails 4. To the rear of the upright section of pipe 72 a solid gusset plate or frame member 73 is securely welded both to the pipe 72 and to the cross pipe or axle 70. A water inlet pipe 74, adapted to be attached to an inlet hose, is welded to the back end of the gusset plate 73 that extends parallel to the vertical section of the pipe 72. An inverted U-shaped channel 75 having tapering side walls is welded to the sides of the horizontal run of the pipe 72 and serves with the pipe as a water conduit from the pipe 74 to the tip of the tine 71. The upper part of the U-shaped inverted channel 75 also serves as the runway or track on which the heated work pieces roll from the tines as they are picked up from the rails 4 until they are deposited on the discharge ramp 8.

As may be seen in Figures XII and XIII the pipe 72 extends to the forward end of the tine 71 and is located between the rails 4. The pipe 72 extends beyond the end of the U-shaped channel 75 and near its tip has a stud 76 directed upwardly in position to prevent any work pieces carried on the end of the tube 72 between the stud and the channel 75 from rolling off the end of the pipe 72. The tine 71 also includes a downwardly directed toe 77 the forward face of which is curved in elevation about the axle pipe 70 has a center and serves to prevent any possible movement of work pieces 1 into the space beneath the pipe 72 when the fork is rocked to its discharging position. Since all of these members are subjected to the heat from the heated work pieces they all must be water cooled and to this end water is admitted through the inlet pipe 74 so that it flows through the interior of the U-shaped channel 75 over the pipe 72 toward its forward end where the top of the channel 75 is welded to the pipe 72 and thence through a notch 78 into the pipe 72 above a partition 79 that directs the water flow still forward in the pipe 72 to its tip where it descends into the forward portion of the toe 77. The partition 79 extends downwardly throughout the greater length of the toe 77 and is welded to the sides of the toe 77 so that the water is forced to flow to the bottom of the toe before returning to the pipe 72 below the partition 79. In this way the water flow traverses the complete length and cools all the surfaces of the tine 71 so as to prevent any overheating of these members.

In the operation of the unloading fork, the fork remains in the down position shown in Figure XII until the transport rails 4—2 have moved a work piece into position above the end of the tine and passed the stud 76. The fork is then rocked, by action of the hydraulic cylinder 30, thereby raising the toe portion and the work piece carried on top of the fork high enough so that it rolls along the now downwardly inclined surface of the inverted channel 75 and off the rear end of the fork onto the receiving or discharge ramp 8.

Referring again to Figure X the fork axle or crosspipe 70 carries on its end an operative connection to a slide rod 80 having collars 81 and 82 arranged to operate limit switches LS5 and LS6. In the arrangement shown, limit switch LS5 is operated to close its contacts when the fork is in its lower or work receiving position and is arranged to close its limit switch LS6 when the fork is rocked to its discharging position.

The electrical and hydraulic equipment for operating the hydraulic cylinders 20, 25, and 30 is illustrated schematically in Figure XV. The sequence of operations, the timing, and the corresponding movements of the rails 4 are indicated in Figures XVI and XVII which may be referred to in connection with the description of the circuits shown in Figure XV.

The electrical equipment for controlling the operation of the hydraulic cylinders 20, 25 and 30 includes a timer T, shown near the upper left-hand corner of Figure XV, and a pushbutton 90 that is used for initiating cycles of operation when the timer has been disabled or disconnected. Two control relays, CR1 and CR2 are employed, each of these are of the latching type, i.e. having a latch coil for drawing the relay to an energized or first position in which the mechanism mechanically locks itself and a trip coil arranged to release the mechanical lock and permit the relay to return to its deenergized position. While not shown in the drawings each of the control relays of the latch type may be provided with additional contacts arranged to break the circuits to the latch and trip coils as soon as the relay has responded to energization of such coils. This is common practice when using latch relays in order to permit the use of intermittent or short duty cycle coils on the relays. In Figure XV the control relays CR1 and CR2 are illustrated in spindle form, i.e. a long horizontal bar carrying all of the contacts extends across the figure has the contacts arranged as required to minimize the crossing of leads in the diagram.

The hydraulic cylinders 20, 25, and 30 are controlled by solenoid operated four-way valves 91, 92, and 93 respectively. At the start of a cycle of operation both of the control relays CR1 and CR2 are in their tripped position as indicated by the spindles being drawn to the right-hand positions. Assuming that a switch 94 is set for automatic operation the timer T is energized to run continuously. At timed intervals, corresponding to the time desired between steps in the operation of the conveyor, the timer energizes a lead 95 by way of contacts within the timer so that current may flow from a supply lead 96 through the now closed timer contacts and lead 95, through normally closed contacts CR2—5 of the CR2 relay and a latch coil L-1 of the CR1 control relay and thence through a lead 97 to a return grounded lead 98. The closing of the timer contacts is represented as point A in the timing diagram, Figure XVII.

As the latch relay CR1 moves to its latched position in response to current flow through its latching coil L-1 it closes its contacts CR1—1 and opens its contacts CR1—2. Closing the contacts CR1—1 completes the circuit from the supply lead 96 through limit switch LS5, which is closed as long as the unloading fork is in its work receiving position, thence through normally closed contacts CR2—4 of the second control relay and a lead 99 to a solenoid A1 of the four-way control valve 91. All the solenoids of the various four-way valves have their return leads connected to the return line 98. Energization of the solenoid A1 draws its armature 100 to the right as shown in the diagram to throw the four-way valve 91 to a position opposite to that shown in the diagram. In the thrown position hydraulic fluid may flow from a pressure line 101 through a speed control valve 102, the four-way valve 91, a conduit or pipe 103, and a second speed control valve 104 to the upper end of the hydraulic cylinder 20 as shown in Figure XV. As the hydraulic fluid enters the upper end of the hydraulic cylinder 20 the fluid trapped beneath its piston flows through a pipe 105, check valve 106, and pipe 107 to the four-way valve 91 and thence to a return pipe 108. The completing of the circuit to the solenoid A1 and the resulting action of the four-way valve 91 starts the timing interval B illustrated in Figure XVII which consists of the time required for the hydraulic cylinder 20 and gears 23, 24 to rock or rotate a rail 4—2 from their first position to their second position as illustrated in Figure XVI. In Figure XVI the arrows "B" adjacent each of the rails indicate the relative motion of the rails as being a pure rotation during this step.

When the hydraulic cylinder 20 reaches the lower end of its stroke, as shown in Figure XV or the upper end of its stroke as shown in Figure II, it closes or operates limit switch LS2 (marked 37 in Figure II) so as to complete a circuit from the now energized lead 99 through leads 109 and 110, to solenoid B1 of the second four-way control valve 92. Energization of the solenoid B1 causes it to draw its armature 111 to the right so as to operate the four-way valve 92. In its new position the valve permits fluid to flow from the pressure line 101 through a speed control valve 112, pipe 113, and auxiliary speed control valve 114 to the left end of the hydraulic cylinder 25 as shown in Figure XV. This is the start of timing period "C" as shown in Figures XVI and XVII, the operation of the hydraulic cylinder 25 serving to move the transport rails 4—2 longitudinally to advance the work pieces one step through the furnace.

As the hydraulic fluid enters the left end of the hydraulic cylinder 25 the fluid trapped behind its piston flows through a pipe 115, check valve 116, and pipe 117 to the four-way valve 92 and from it to the return line 108. When the piston of the hydraulic cylinder 25 has moved all the way to the right thus indicating the completion of step C it closes limit switch LS4 so as to permit current to flow from the energized leads 99 and 109, through a lead 118 and solenoid C1 of the four-way valve 93. Solenoid C1 draws its armature 119 to the left as seen in Figure XV so that pressure fluid may flow from the pressure line 101 through a speed regulating valve 120, pipe 121, and speed control valve 122 to the top end of the hydraulic cylinder 30. This is a start of operation of timing interval "D" shown in Figures XVI and XVII. This interval is the operation of the fork to lift a work piece from the rails 4 and cause it to roll across the fork and onto the discharge ramp 8. As the fluid is admitted to the upper end of the hydraulic cylinder 30, as shown in Figure XV, it tips the fork 7 clockwise. As the fork starts to move the limit LS5 operated thereby, opens its contacts thus breaking the circuit to the lead 99 and deenergizing the solenoid coils A1, B1, and C1. However, the four-way valve 93 is in position to pass hydraulic fluid to the upper end of the cylinder 30 so that it completes its stroke.

During the stroke of the piston of the cylinder 30 hydraulic fluid is forced from the cylinder through a pipe 123, check valve 124, and pipe 125 leading back to the four-way valve 93 and thence to the return pipe 108. When the hydraulic cylinder 30 completes its stroke it operates limit switch LS6 so as to close its contacts LS6, shown near the upper right hand corner of the diagram, so that current may flow from the supply lead 96 through a lead 126 to latch coil L2 of the second control relay CR2 and thence through lead 127 to the return line 98. This energizes or latches the second control relay CR2 in its latched position so as to open contacts CR2—5 in the energizing circuit to the latch coil L-1 of the first relay and contacts CR2—4 connected to the lead 99 so as to prevent further energization of the solenoids A1, B1, or C1. In addition to operating latch coil L2 of the second control relay the closure of the limit switch LS6 also energizes lead 128 which, as soon as the control relay CR2 is in its latched position, energizes a lead 129 and solenoid A2 controlling the first four-way valve 91.

This starts operation "E" which is the return rotation of all the rails 4 to their original positions. The energization of the solenoid A2 returns the four-way valve 91 to its original position so that pressure fluid is now admitted from the line 101, through the four-way valve 91, pipe 107, a speed control valve 130 that is connected in parallel with the check valve 106, to the bottom end of the hydraulic cylinder 20 as shown in Figure XV. The fluid discharged from the upper end of the hydraulic cylinder flows through a check valve 131 connected in parallel with the speed control valve 104 and thence through the four-way valve 91 to the return line 108.

As the piston of the hydraulic cylinder 20 completes its stroke it closes the limit switch LS1 so as to close contacts LS1 connected between the now energized lead 129 and a control lead 132 connected to solenoid C2 of the four-way valve 93.

This starts operation "F," the return of the fork to its lower position, through the four-way valve 93 to its original position so as to admit pressure fluid through pipe 125, speed control valve 133 connected in parallel with check valve 124, and pipe 123 to the bottom end of the cylinder 30. The resulting operation of hydraulic cylinder 30 turns the rocking unloading fork 7 back to its original position as indicated by the arrows F in Figure XVI. When the rocking fork and hydraulic cylinder 30 reach their original positions, limit switch LS5 is operated to close its contacts and energize lead 134 which is connected through a now closed contact CR2—1 and lead 135 to solenoid B2 of the second four-way valve 92. This returns the four-way valve 92 toward its original position and starts the timing interval "G," shown in Figures XVI and XVII which is the return of the transport rails 4—2 to their original positions.

When the hydraulic cylinder 25 reaches the end of its stroke and the transport rails are returned to their original positions, limit switch LS3 is operated which by closing its contacts LS3, located near the central portion of the diagram, closes a circuit from the supply lead 96 directly to a trip coil T1 of the first control relay CR1. Since control relay CR2 is now in its latched position its contacts CR2—3 are closed thereby completing the circuit from trip coil T1 through a lead 136 to the return lead 98. Tripping the first control relay CR1 returns it to the position shown in the diagram thereby closing its contacts CR1—2, located at the upper right hand corner of the diagram, so that current may flow from the lead 96 through trip coil T2 of the second control relay CR2 thereby tripping it to its initial position as shown in the diagram. This completes the cycle and the circuit and the four-way valves are in their original positions and waiting for the next cycle of operation.

This waiting period for the next cycle of operation is marked "Dwell" in Figure XVII. The "Dwell" period takes the remainder of the cycle time as determined by the impulses from the timer T and will vary one way or the other depending upon the total length of time required for the completion of steps B through G inclusive. When properly adjusted the "Dwell" interval will be a substantial part of the total cycle time and may be varied as is required by the particular heating requirements of the work pieces.

The circuit is protected against false operation should the sequence of operations of the hydraulic system fail to take place within the allotted time. This protection is provided by the contacts CR2—5 of the second control relay which, if the second control relay is still in its latched position interrupts the circuit to the latching coil L-1 of the first control relay CR1.

If desired an alarm circuit may be included to sound an alarm or trip an alarm signal should the timing interval expire before the completion of the conveyor cycle of operation. This additional control includes a lead 137 connected to the timer T to be energized momentarily a short interval before a regular timing impulse. The lead 137 is connected through contacts CR1—3 of the first control relay and contacts CR2—6 of the second control relay, connected in parallel, and thence through an alarm relay "A" connected to the return lead 98. In the event that either of the latch relay CR1 or CR2 is in its latched condition, indicating that the previous cycle of steps have not been completed, the energization of the lead 137 immediately prior to the start of the next cycle energizes the alarm circuit which may be arranged to call the operator's attention to the failure or may be arranged to shut down the furnace.

The speed of operation of each of the steps illustrated in Figures XVI and XVII is controlled by the speed control valves 102, 112 or 120 which regulate the speed in both directions. Individual directional speed controls for each of the hydraulic cylinders is provided by the valves 104 and 130 for the hydraulic cylinder 20, the valves 114 and a corresponding valve 138 for the cylinder 25, and the valves 122 or 133 for the cylinder 30. These latter valves, being by-passed by the check valves, are each effective to control speed in one direction only.

The construction of the rails 4 presents a problem in designing apparatus of this type. This problem arises because the rails are subjected to the high temperature of the furnace and they must carry lugs or studs along their outer surfaces to provide interrupted surfaces for the feeding of the work. If studs are used on the rails the studs must not extend more than a certain critical length or the ends will not have sufficient heat transfer to the cooled rail tube to keep their temperatures below the burning or scaling temperature. As long as the studs or protuberances can be kept short the cooling of the water cooled rail is sufficient to protect them from over-heating. Another problem is to keep the rails sufficiently straight so that the work will move properly along the rails. The rails are installed as closely co-planar as possible but nevertheless a work piece will usually rest on two or three of the rails rather than on all four of them. The arrangement of the studs 63 along the rails prevents, when the studs are extended upwardly, the work from rolling freely along the rails. When the rails are rocked or rotated to their second positions with the studs of the support rails 4—1 out of line of the work the work may roll on the support rails 4—1 when the transport rails 4—2 are moved forwardly with their studs uppermost. Whether the work is rolled or is carried forward bodily depends upon the relative friction between the work and the transport rails 4—2 with respect to the friction between the work and the support rails 4—1.

The mounting of the studs on the rails is illustrated in greater detail in Figures XVIII and XIX. As shown in these figures each of the studs 63 is made from a longer commercially obtainable stud 140 (shown in Figure XVIII) that is adapted for attachment by welding. The stud 140 is formed with a reduced diameter portion 141 at its lower end, which portion is counterbored to receive a welding flux 142. The ends of the rim of the counterbore such as the lip 143 are peened or rolled inwardly to hold the flux 142 in place. These commercially obtainable studs 140 are then further machined by cutting a groove 144 circumferentially about the stud at a distance of about ⅜ of an inch from the reduced diameter portion 141. The studs 140 fit into an electrode holder of an arcwelder and are attached to the rails by being forced against the rail, as shown in the left of Figure XIX, while current from the welder flows from the stud 140 into the rail 4. The heat generated in the reduced cross-sectional area of the lip 143 around the flux 142 causes the lip 143 to fuse, melt the flux, and the adjacent surface of the tube, the resulting fusion causing the stud 140 to be welded securely to the rails 4. In this process the thin lips 143 and the thin section surrounding the flux is fused and the stud finally seats on the rail 4 with the bottom of the counterbore 144 securely bonded to the rail and with the metal that formed the thin wall or lip 143 having been fused to form the welds between the stud and the rail. After the studs are so installed or welded to the rails the upper portions above the cuts 144 are knocked off by breaking the reduced diameter neck portion resulting from the cut 144 thus leaving the finished stud 63 as shown at the right in Figure XIX.

A furnace conveyor system as just described provides a simple, rugged apparatus for automatically carrying work pieces through a high temperature region, equalizing the heat input into the work piece by rotation of the work piece and shading of parts of the work piece that tend to heat too rapidly.

Various modifications in specific details of construction may be made without departing from the scope of the invention.

The foregoing disclosure is the best mode known to the inventor of carrying out the invention, the scope of which is limited only by the appended claims.

Having described the invention, I claim:

1. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, an escapement feeding mechanism operatively connected to the transport rails for admitting work pieces to the rails, internally cooled adjustably positioned shadow rails extending closely adjacent the path of selected portions of the work pieces for temperature control, and unloading means for removing heated work pieces from the rails.

2. The combination according to claim 1 wherein all of the rails are internally cooled.

3. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, a longitudinally extending row of studs on each of said rails, an escapement feeding mechanism operatively connected to the transport rails for admitting work pieces to the rails, a row of studs on each of the support rails being in work obstructing position and a row of studs on each of the transport rails being in work non-obstructing position when the work piece rolls onto the rails, which rows of support rail studs are rotated out of the path of the work pieces and which rows of transport rail studs are rotated into the path of the work pieces before the transport rails are moved forward, whereby the work pieces are retained in a transverse position relative to the rails and nevertheless advanced when the transport rails move forward, internally cooled adjustably positioned shadow rails extending closely adjacent the path of selected portions of the work pieces for temperature control, and unloading means for removing heated work pieces from the rails.

4. The combination according to claim 3 wherein all of the rails are internally cooled.

5. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, a source of cylindrically shaped work pieces located above the rails, a ramp connecting the source and the rails, and an escapement feeding mechanism that comprises at least one pair of dogs and that is operatively connected to the transport rails for admitting a work piece to the rails each time the transport rails move to and fro.

6. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel and substantially coplanar with the support rails, a longitudinally extending row of studs on each of said rails, a source of cylindrically shaped work pieces located above the rails, a ramp connecting the source and the rails, and escapement feeding mechanism that comprises at least one pair of dogs and that is operatively connected to the transport rails for admitting work pieces to the rails, a row of studs on each of the support rails being in work obstructing position and a row of studs on each of the transport rails being in work non-obstructing position when the work piece rolls onto the rails, which rows of support rail studs are rotated out of the path of the work pieces and which rows of transport rail studs are rotated into the path of the work pieces before the transport rails are moved forward, whereby the work pieces are retained in a transverse position relative to the rails and nevertheless advanced when the transport rails move forward.

7. In a furnace for heating work pieces to an elevated temperature, in combination, a furnace through which the work pieces are passed, a plurality of rotatable work support rails extending through the furnace, and a plurality of axially slidable rotatable transport rails extending through the furnace generally parallel to and substantially coplanar with the support rails, the transport rails being operatively connected to the support rails, whereby rotation of the support rails rotates the transport rails.

8. The combination according to claim 7 wherein the rails are internally cooled.

9. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, means for rotating the support rails, a gear fixed to each support rail, a gear operatively connected to each transport rail, the gears on the support rails driving the gears on the transport rails to rotate the transport rails, means for reciprocating the transport rails to and fro, and a longitudinally extending row of studs on each rail, a row of studs on each of the support rails being in work obstructing position and a row of studs on each of the transport rails being in work non-obstructing position when a work piece is loaded onto the rails, which rows of support rail studs are rotated out of the path of the work pieces and which rows of transport rail studs are rotated into the path of the work pieces before the reciprocating means drives the transport rails forward and which rows of support rail studs are rotated into the path of the work pieces and which rows of transport rail studs are rotated out of the path of the work pieces before the reciprocating means drives the transport rails back, whereby the work pieces are advanced when the transport rails move forward, are held stationary when the transport rails move back, and nevertheless are held at all times in a transverse position relative to the rails.

10. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, an unloading member that is pivotally mounted at each side of the furnace near its discharge end and that is located between a pair of rails, the rear end of the member normally being below the level of the rails, a finger on the top of the rear end of the member, a leg on the bottom of the rear end of the member, and means for rocking the members, the fingers lifting a work piece from the rails to an elevation above the front end of the members and the legs preventing another work piece from being advanced along the rails when the rocking means pivots the members out of normal position, whereby the lifted work piece rolls down the tilted upper surfaces of the members.

11. The combination according to claim 10 wherein the unloading members and their legs are internally cooled.

12. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, means for rotating the rails, means for driving the transport rails to and fro, an escapement feeding mechanism operatively connected to the transport rails for admitting work pieces to the rails, internally cooled adjustably positioned shadow rails extending closely adjacent the path of selected portions of the work pieces for temperature control, unloading means for removing the heated work pieces from the rails, and electrical circuit means for controlling the operation of the rotating means, of the driving means and of the unloading means.

13. In a furnace for heating workpieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, means for rotating the rails, means for driving the transport rails to and fro, a longitudinally extending row of studs on each of said rails, an escapement feeding mechanism operatively connected to the transport rails for admitting work pieces to the rails, a row of studs on each of the support rails being in work obstructing position and a row of studs on each of the transport rails being in work non-obstructing position when the work piece rolls onto the rails, which rows of support rail studs are rotated out of the path of the work pieces and which rows of transport rail studs are rotated into the path of the work pieces before the transport rails are moved forward, whereby the work pieces are retained in a transverse position relative to the rails and nevertheless advanced when the transport rails move forward, internally cooled adjustably positioned shadow rails extending closely adjacent the path of selected portions of the work pieces for temperature control, unloading means for removing heated work pieces from the rails, and electrical circuit means for controlling the operation of the rotating means, of the driving means and of the unloading means.

14. In a furnace for heating work pieces to an elevated temperature, in combination, a furnace through which the work pieces are passed, a plurality of rotatable work support rails extending through the furnace, a plurality of axially slidable rotatable transport rails extending through the furnace generally parallel to and substantially coplanar with the support rails, means for rotating the support rails, means for reciprocating the transport rails to and fro, and a longitudinally extending row of studs on each rail, a row of studs on each of the support rails being in work obstructing position and a row of studs on each of the transport rails being in work non-obstructing position when a work piece is loaded onto the rails, which rows of support rail studs are rotated out of the path of the work pieces and which rows of transport rail studs are rotated into the path of the work pieces before the reciprocating means drives the transport rails forward and which rows of support rail studs are rotated into the path of the work pieces and which rows of transport rail studs are rotated out of the path of the work pieces before the reciprocating means drives the transport rails back, whereby the work pieces are advanced when the transport rails move forward, are held stationary when the transport rails move back, and nevertheless are held at all times in a transverse position relative to the rails.

15. The combination as described in claim 14 in which some of said transport rails are rotated in a clockwise direction and some are rotated in a counterclockwise direction in a manner to prevent movement of the work transverse to the longitudinal reciprocatory movement of said transport rails.

16. The combination as described in claim 14 in which some of said support rails are rotated in a clockwise direction and some are rotated in a counterclockwise direction in a manner to prevent movement of the work transverse to the longitudinal reciprocatory movement of said transport rails.

References Cited in the file of this patent

UNITED STATES PATENTS

| | | |
|---|---|---|
| 821,752 | Shaw | May 29, 1906 |
| 2,547,755 | Hess | Apr. 3, 1951 |
| 2,620,918 | Fallon | Dec. 9, 1952 |
| 2,652,240 | Nesbitt | Sept. 15, 1953 |